INVENTORS
ARNOLD WEISSELBERG
HORST HERFURTH

BY *Jab Hein*

AGENT

INVENTORS
ARNOLD WEISSELBERG
HORST HERFURTH

3,436,519
SELF-LOCKING LEVER SYSTEM FOR SEAM WELDING DEVICES
Arnold Weisselberg and Horst Herfurth, Halle an der Saale, Germany, assignors to Zentralinstitut für Schweisstechnik der DDR, Halle an der Saale, Germany
Filed Nov. 6, 1967, Ser. No. 680,840
Int. Cl. B23k 9/12
U.S. Cl. 219—126                                             11 Claims

ABSTRACT OF THE DISCLOSURE

Lever system, particularly for electric slag welding devices adapted for vertical or inclined seams, for applying pressure to form shoes engaging the elements to be welded together on both sides of the welding seam, for guiding the device along the edges of the elements while keeping the wire feed and nozzle means of the device centered with respect to the seam, regardless of variations in the gap distance between the elements, and for providing uniform weight distribution of the welding device on the two sides of the seam, with facilities for adjusting the distance between two, preferably conical guide wheels engaging the edges of the elements, depending upon the thickness thereof.

---

The invention relates to a self-locking, articulated lever system for the application of pressure upon guide rollers or wheels of climbing seam welding machines, in particular, for electric slag welding of perpendicular or inclined seams with the aid of a chain lifting mechanism.

Already known are transporting devices for electric slag welding, which consist of two parallel base frames disposed at both sides of the sheet-metal pieces or elements to be welded, each of them carrying a pair of wheels and being interconnected by tension rods. The pressure of the wheels upon the seam edges is obtained by helical springs disposed on the tension rods, whereby the copper form shoes of these devices are attached to a respective other lever linked to the base frame.

The drawback of these machines or devices lies above all in the necessity of having to readjust constantly, as the welding operation progresses, both the helical springs of the tension rods and the bearing pressure of the form shoes, to conform with the differences in thickness and irregularities of the elements to be welded.

Also known are devices in which, at the terminal point of two levers interconnected by a tension rod, the form shoes and the transport or guide wheels are mounted so as to oppose each other in pairs. In a similar design, the counter wheel is replaced by a pair of wheels arranged so as to follow each other in the welding direction and mounted in a shaft bridge so as to pivot about the terminal point of the lever. This is to avoid lateral oscillation of the device. However, the wheel pressure is again obtainable only by modifying the preload at the spring-loaded tension rod which is connected to the levers at the height of the transport and guide wheels. A further tension rod is provided in order separately to regulate the bearing pressure of the copper form shoes.

Another machine has an articulated, divided lever which carries a wedge-shaped drive wheel, rolling off along the seam edges, and a copper form shoe, and which is mutually supported in a resilient manner while a likewise conical counter wheel and a copper shoe are supported at the opposing seam edges by a one-part lever. Both levers are to be interconnected nonresiliently by a strong, adjustable bolt. This way, the resiliently intersupported articulated lever transfers its tensional force to the drive wheel and copper form shoe so that, due to the resulting motional equalization, a readjustment of the spring bolt is rarely necessary.

Also known is a chain lifting device for electric slag welding, whereby the form shoes are pressed against the seam flanks by two levers which are connected by joints and are under the load of a spring bolt, or by their scissors-type mounting through the effect of the natural weight of the lever system and the attached welding machine. The lift in this case is produced by a chain lifting device applied to the upper edge of the welding joint. However, in this lever system only one shoe is pressed against the workpieces or elements by the chain lifting device; the other shoe is pressed against it by the momentum generated by the wire-feed set. Consequently, the bearing pressure of the copper shoes varies greatly. When gap changes occur in such a system with conical rollers, the filler wire nozzle is shifted with respect to the center of the sheet thickness so that the seams become unevenly wide on each side, causing inadequate deposits on one side and generating greater angular shrinkage.

To avoid this disadvantage, a welder must supervise the welding process and correct the nozzle accordingly. But if only smooth rollers with a narrow guide cone in the center of the rollers are used in the lever system, whose roll-off surfaces contact the work-piece surface, then there is no possibility of providing a precisely centric guidance of the machine. The small cone in the rollers can migrate to the left- as well as the right-hand side of the prepared seam edge. In that case, no fixed adjustment of the nozzle is assured either. Lateral corrections of the nozzle with respect to the seam flanks must be made during the welding process.

It is the object of the invention to provide a self-locking articulated lever system for fully automatic electric slag weld machines, which can be inserted into the welding joint readily and without danger, and which requires no supervision or readjustment during the welding operation.

The invention solves the task of providing a self-locking lever system, preferably moved by a chain lifting device, which, after insertion into the welding joint, can be fastened immediately so as to be self-locking, guaranteeing centric guidance of the filler wire nozzle during the entire welding process as it progresses along the welding joint, whereby a pressure is required which acts uniformly on both form shoes and stays uniform over the entire seam joint to be welded.

This problem is solved according to one of the important features of the invention in that a push lever, carrying a preferably copper first form shoe in a known manner, is provided at one side of the sheet-metal joint, the push lever carrying at its other end a bridge member in which run two preferably conical guide wheels arranged in tandem so as to be self-centering with respect to the welding joint, that is their conical surfaces run on the seam flanks. So as to be able to ride over irregularities or bends in the sheet metal, the first form shoe and the bridge member are mounted in a likewise known manner so as to pivot to the push lever.

A lever system disposed at the opposite side of the sheet-metal elements to be welded is connected to the push lever by a pull rod. The latter is detachably and longitudinally adjustably received by a guide carriage which, preferably by means of a rigid joint, is connected to an equal-armed lever member in one of the terminal points of the latter. In the other terminal point of this lever member is mounted, more specifically at the height of the upper guide wheel, a preferably conical counter wheel which contacts the seam edges. At the other terminal point of the lever member, a chain lifting mechanism may be provided.

Mounted in the central point of the equal-armed lever, so as to be pivotable and shiftable, is another push lever which carries a second, preferably copper form shoe at its end and is joined by means of a support lever which is rigidly connected to the guide carriage.

To adapt the articulated lever system to various sheet-metal thicknesses to be welded, according to another important feature of the invention, the pull rod in its axial direction has a lengthwise gradation in the form of at least two recesses, each of which is adapted to receive a detachable bolt introduced through a recess of the guide carriage.

Disposed so as to pivot around this detachable bolt is, furthermore, a second equal-armed lever member in the preferred form of an angular lever whose one terminal point is mounted, jointly with the guide carriage, in the lower terminal point of the first-named equal-armed lever member. The other terminal point of the angular lever is under the pressure of a longitudinally adjustable biasing spring bolt which is supported against the second equal-armed lever member in such a manner that the aforementioned counter wheel, upon tightening of the spring bolt, is pressed into the seam gap, thus simulating the tightening of the chain by the lifting mechanism. This way, the lever system can be attached in the welding joint so as to be self-locking.

To facilitate inserting the detachable bolt into the recesses in the pull rod, the guide carriage and the angular lever, which is necessary particularly for the adaptation of the gradation in sheet-metal thickness to the divisions of the pull rod, the recess in the guide carriage is an elongated hole or recess disposed axially to the pull rod, and the recess in the angular lever is an elongated hole transverse to the former. Since the guide carriage and the angular lever have a common pivot point, a safe arrestment is possible in this manner.

In addition, it is achieved by the arrangement of the push lever, shiftable in elongated holes or recesses, which may carry the wire feed, on the first-mentioned equal-armed lever member that the position of the welding nozzle with respect to the center of the sheet-metal thickness or welding seam is not affected when movements of the lever system occur, caused by changes in the gap width.

In accordance with further noteworthy features of the invention, the above-mentioned chain lifting mechanism may comprise a flexible element in the form of a chain, having one end attached to the push lever which cooperates with the pair of guide wheels on one side of the welding joint while the other end of the chain is preferably guided over a sprocket wheel associated with the first equal-armed lever member, and runs from there to a stretching mechanism or other suitable device. Drive means may be provided, preferably with a worm-gear mechanism, for rotating the sprocket wheel, allowing thereby the longitudinal movement of the lever system along the welding joint.

According to yet another feature, a wheel bridge may be attached to the ends of one or both elements to be welded together, in alignment with the welding joint, at least one sprocket wheel being provided on said bridge for guiding the chain about the elements, thereby providing uniform weight distribution of the welding device between the two sides of the joint.

With the articulated lever system according to the invention it is possible to automate electric slag welding and to weld, without supervision, long perpendicular or inclined sheet-metal joints as they occur particularly in the steel, shipbuilding, boiler and tank building industries. Due to the self-locking feature, adjustable when inserting the articulated lever system into the seam joint, this job can be done wihout danger by two unskilled persons.

The various objects, features and attendant advantages of the present invention will become more apparent from the following description of a preferred, exemplary embodiment of the inventive lever system when considered in conjunction with the accompanying drawings, wherein.

Figure 1:
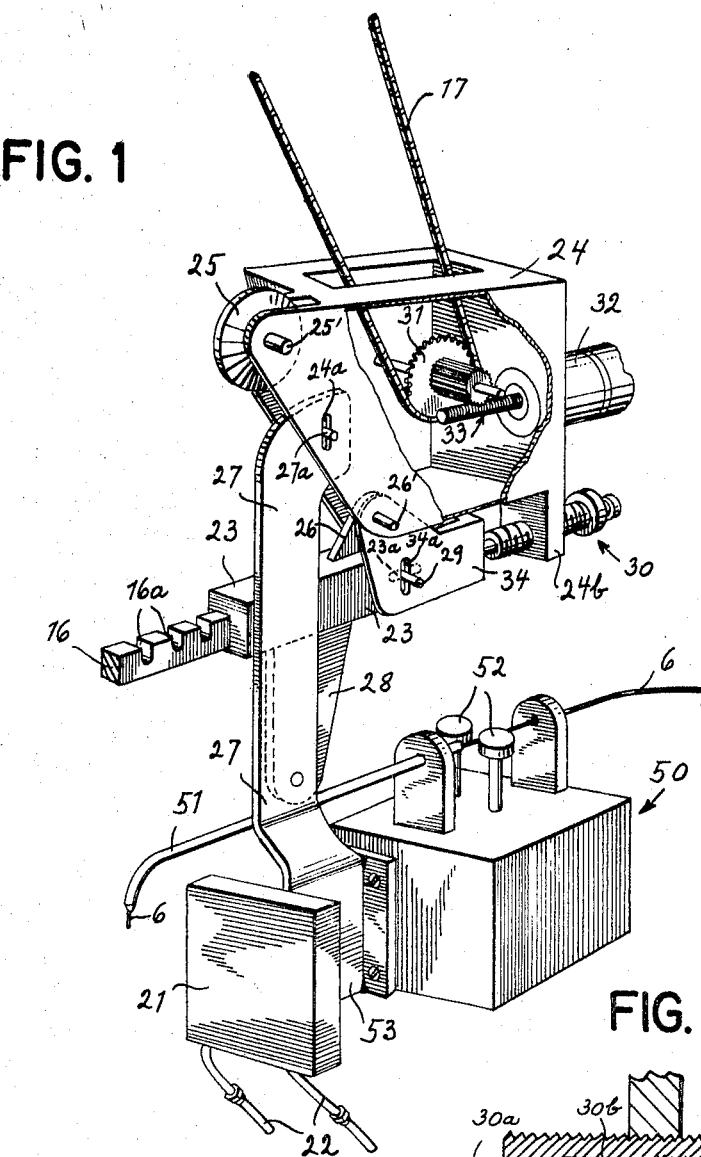
FIG. 1 is a perspective view of the inventive lever system, showing only the structural elements on one side of the sheet-metal or other elements to be welded togeher.
Figure 2:
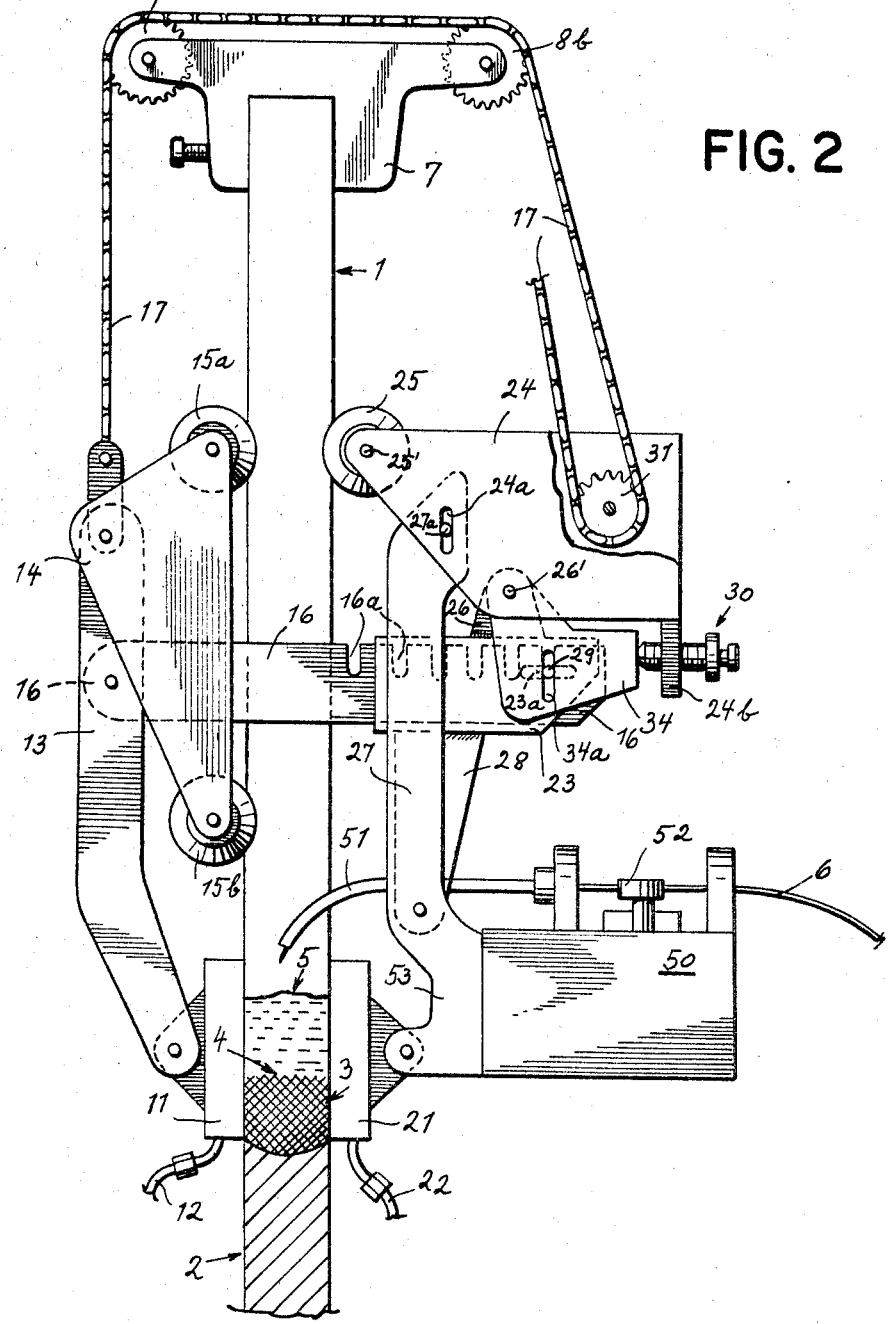
FIG. 2 is a complete side elevational view of the lever system, including the elements partly welded together, and also including the structural elements on the other side of the welding joint.

The sheet-metal plates or elements to be joined by welding are omitted from FIG. 1 for the sake of clarity; in FIG. 2, one of the elements is seen edgewise at 1 while the completed welding seam, below the lever system and the welding device, is identified by numeral 2. Above this joint, a metal melt is shown at 3, bordered by the melt zone 4, and by a slag melt 5. In this area, the inventive lever system includes a pair of form shoes 11 and 21, respectively, preferably made from copper. These shoes are water-cooled in the usual manner; inlet and outlet conduits 12 and 22 are shown for the respective shoes 11 and 21.

First, the structure on the left-hand side of the sheet-metal elements will be described (see in FIG. 2 only). The shoe 11 is linked to a push lever 13 having another terminal point disposed so as to pivot in a bridge member 14 which carries two preferably conical guide wheels 15a, 15b in spaced-apart relation along the vertical welding joint. The form shoe 11 and the wheels 15a, 15b obtain their bearing pressure by way of a pull rod 16 which traverses the welding joint and is received, on the other side, by a guide carriage 23. The chain connected to the bridge member 14 will be described later.

On the right-hand side of the sheet-metal elements (shown in both FIGS. 1 and 2), a housing 24 is provided to accommodate a chain lifting mechanism and is designed as an equal-armed lever member (not shown in the drawing to true proportions). In the respective upper and lower terminal points of the lever are mounted a conical counter wheel 25 and a short lever 26, about journaling points 25' and 26', respectively. The lever 26 is rigidly connected to the guide carriage 23, and both parts 25, 26 can turn and pivot, respectively, about the housing 24.

The central point of the housing or lever member 24, half-way between the points 25', 26', has an elongated slot 24a in which can slide a guide pin 27a of a push lever 27 which carries, at its lower end, the form shoe 21 mentioned before. The latter can thus pivot and it can also be shifted whereby the push lever 27 is guided against the guide carriage 23 by a support lever 28, likewise in a fixed connection with the guide carriage 23.

The push lever 27 carries a wire feed mechanism, actually forming part of the welding device, generally identified by numeral 50, and including a guide tube and nozzle structure 51 for a filler wire 6, a pair of feed rollers 52, and other conventional elements. A portion of the mechanism 50 may be in the form of a linkage 53 between the lower end of the push lever 27 and the form shoe 21 although these elements may of course be directly linked together. Conventional control equipment and other useful devices may of course be connected with or in operative connection with the wire feed mechanism of the welding device.

The guide carriage 23 is preferably provided with an elongated recess 23a through which passes a bolt 29. Pivoted around this bolt is a second equal-armed lever member 34, similarly having an elongated slot or recess 34a therein. One terminal point of member 34 coincides with point 26' where it is mounted jointly with lever 26 at the described terminal point of the member 24. The bolt 29 constitutes the central point of the lever member 34. The other terminal point of member 34, directed away from the welding joint, is loaded by biasing means in the form of a spring bolt 30 which is accommodated in an extension 24b of the housing or member 24.

Figure 1A:
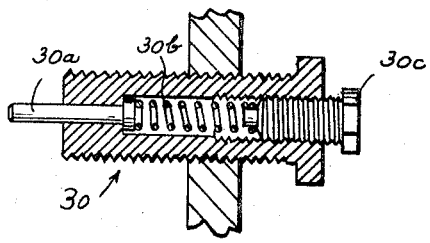
FIG. 1a is a sectional, partial view of biasing spring bolt means operative to urge a counter wheel against the welding joint.

FIG. 1a shows the spring bolt 30 on an enlarged scale, with an actuating pin 30a, a spring element 30b, and an adjusting screw 30c, for regulating the load applied to the lever member 34.

The pull rod 16 has a number of recesses 16a into which the removable bolt 29 can be inserted, simultaneously with the elongated recesses 23a and 34a, provided respectively in the guide carriage 23 and the angular lever 34. It can be seen that the recesses 23a and 34a are perpendicular with respect to each other; the recesses 16a are parallel with the recess 34a.

Upward movement of the articulated lever system is provided by the mechanism to be described hereunder. The afore-mentioned chain is designated 17 and is attached with one end to the upper end of the push lever 13 (see FIG. 2). The chain is preferably guided over a wheel bridge 7 having one or two sprocket wheels 8a, 8b thereon. The bridge may be clamped or otherwise secured to the sheet-metal elements, e.g., element 1, by conventional means, substantially in vertical alignment with the welding joint.

In the chain lifting mechanism forming part of the housing or member 24 (see FIG. 1), a sprocket wheel 31 is provided about which the chain 17 is passed with a portion intermediate its ends. The other end of the chain may run loosely off the housing 24 or it may be returned over the wheel bridge 7 (arrangement not shown) so as to be counterbalanced by a counterweight (not illustrated). The loose chain end may also run into an appropriate chain box (not shown).

A reversible drive motor 32 may be provided in housing 24, for cooperation with the wheel 31 by way of a worm gear 33 or the like mechanism. The control circuit of the motor may of course be coordinated with that of the mechanism 50 so as to maintain uniform welding speed at a uniform feed of the lever system along the welding joint. The chain 17 on which the motor 32 acts is kept taut by the described, conventional stretching mechanism.

Figure 1B:
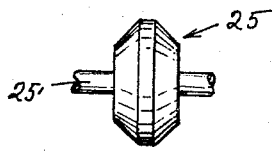
FIG. 1b is an elevational view of one of the guide wheels having a conical profile so as frictionally to engage the welding joint.

FIG. 1b shows the afore-mentioned conical counter wheel 25, rotatable about its shaft journaled at 25'. The guide wheels 15a, 15b may be given a similar configuration, if necessary, for better frictional engagement with the flanks of the welding joint. As shown, the wheels 15a and 25 are substantially at the same height and thus contribute to the self-locking feature of the inventive articulated lever system.

The operation of the inventive self-locking, articulated lever system is characterized by two phases.

Phase 1, clamping or locking of the system to the elements to be welded.—The subassembly consisting of parts 11, 13, 14, 15a, 15b and 16 of the lever system is attached to the welding joint 2 of the elements to be united, and the pull rod 16 is pushed across the joint so that guide carriage 23 of the second subassembly can be pushed on top of the former until both form shoes 11, 21 and the guide wheels 15a, 15b as well as the counter wheel 25 make contact with the sheet-metal elements. The angular lever 34 is now pivoted in point 26' so far by means of the spring bolt 30 that the bolt 29 can be introduced into one of the recesses 16a of the pull rod 16.

Upon further tightening of spring bolt 30, by way of its screw 30c, the angular lever 34 pivots only bolt 29, thus turning point 26' of the equal-armed lever member 24 around point 25' so that the counter wheel 25 and the form shoe 21 support themselves against the pressure of the form shoe 11 and of the guide wheels 15a, 15b, thus locking the system with respect to the sheet-metal elements to be joined.

Phase 2, continuous welding operation.—After laying the chain 17 across the wheel bridge 7, after it has been attached, for example by a screw clamp, to the upper edge of the welding joint, and after suspending it, the chain lifting mechanism pulls the equal-armed lever member 24 so that it is again point 26' which pivots about point 25'. The same forces now act as in phase 1. Therefore, when there are changes in the welding gap between the workpieces, the bearing pressure of the guide rollers 15a, 15b and form shoes 11, 21 is automatically readjusted due to the force generated by the chain lifting mechanism and the natural weight of the entire equipment.

Due to the fact that the guide bolt 27a is mounted in the middle between the pivot points 25' and 26', when gap changes occur, the push lever 27 carrying the wire-feed mechanism 50 with the filler-wire nozzle 51 is left in the same position, due to the opposingly oriented pivoting movements of the points 25' and 26' so that the nozzle remains adjusted to the seam center, and no noteworthy changes can develop in the welding seam.

The foregoing disclosure relates only to a preferred, exemplary embodiment of the inventive lever system, which is intended to include all changes and modifications, as well as additions to the example described and illustrated, which are within the spirit and scope of the invention as set forth in the features explained in the preamble as well as the appended claims.

What we claim is:

1. A self-locking lever system for applying pressure to elements to be welded together in a seam welding device, substantially in the area of the welding seam therebetween, particularly in electric slag welding of substantially vertical and slightly inclined seams, comprising, in combination: a pair of form shoes adapted to engage said elements on both sides of said welding seam and to apply pressure thereto; a bridge member on one side of said seam; two guide wheels journaled in said bridge member in spaced-apart relationship along said seam, and adapted to contact said one side of the seam; a first push lever linking said bridge member to one of said form shoes on said one side; a guide carriage on the other side of said seam; a pull rod interconnecting said first push lever with said guide carriage in a releasable and adjustable manner, transversely to said seam; a first equal-armed lever member disposed above said guide carriage; a third guide wheel journaled in said first lever member at a first point constituting the end of one of its arms, and adapted to contact said other side of the seam substantially opposite the upper one of said two guide wheels; said guide carriage being pivotally connected to said first lever member at a second point constituting the end of its other arm; a second push lever journaled in said first lever member, in a pivotable and lengthwise movable manner, at a third point constituting the center point between said first and said second points at said ends of the equal arms, and linking said first lever member to the other of said form shoes on said other side and below said guide carriage; and a support lever rigidly attached to said guide carriage and pivotally linked to said second push lever at a point close to said other form shoe.

2. The lever system as defined in claim 1, wherein at least the upper one of said two guide wheels and said third guide wheel have conical profiles for frictionally engaging said welding seam.

3. The lever system as defined in claim 1, wherein the pivotal connection between said guide carriage and said first lever member at said second point is by way of a short lever protruding from said guide carriage in a direction substantially opposite to that of said support lever.

4. The lever system as defined in claim 1, further comprising means, interconnecting said first push lever and said first lever member by way of a flexible element, for moving said form shoes during the welding operation substantially simultaneously along said welding seam.

5. The lever system as defined in claim 4, wherein said flexible element is a chain attached with one end to said first push lever, and with the other end to a stretching mechanism, said first lever member having thereon a sprocket wheel in engagement with an intermediate portion of said chain, said moving means further including reversible drive means for said chain wheel, whereby to move the lever system along said welding seam.

6. The lever system as defined in claim 5, wherein said moving means further includes a wheel bridge adapted to be secured to the ends of said elements to be welded together, in substantial alignment with said welding seam, at least one sprocket wheel being provided on said bridge for guiding said chain about said elements, intermediate said one end of the chain and said intermediate portion thereof engaged by said sprocket wheel on the first lever member, thereby providing a substantially uniform weight distribution of the seam welding device between the two sides of said seam.

7. The lever system as defined in claim 1, wherein said pull rod has therein at least two longitudinally spaced apart recesses adapted for selective engagement by a removable bolt passing through a recess in said guide carriage, allowing adjustment of the distance between guide wheels on both sides of said seam, depending upon the thickness of said elements.

8. The lever system as defined in claim 7, further comprising a second equal-armed lever member disposed between said guide carriage and said first lever member, and adjustable biasing means attached to a portion of said first lever member, said second lever member being pivoted at a first point, constituting the end of one of its arms, to said second point wherein said guide carriage is pivotally connected to said first lever member, said biasing means acting on said second lever member at a second point constituting the end of its other arm, while the center point of said second lever member, between said first and said second points thereof, is pivoted to said bolt which selectively engages one of said recesses in the pull rod and said recess in the guide carriage, whereby said third guide wheel is urged into firm frictional engagement with said other side of the seam, opposite said upper one of the two guide wheels on said one side of the seam.

9. The lever system as defined in claim 8, wherein said recesses in the pull rod and said recess in the guide carriage are elongated, the former extending transversely of said pull rod while the latter is substantially perpendicular to the former and extends axially in said guide carriage.

10. The lever system as defined in claim 9, wherein said first lever member has an elongated recess in the area of said third point, and said second push lever has attached thereto a guide pin slidable in said recess, whereby the lever system remains centered with respect to said seam regardless of variations in the gap distance between said elements.

11. The lever system as defined in claim 10, further comprising a linkage between the pivotal connection of said second push lever and said support lever, on the one hand, and said other form shoe, on the other hand, said linkage being adapted to carry wire feed and nozzle means forming part of the seam welding device in the region of and slightly above the fresh seam formed between said form shoes while they are moved between said elements during the welding operation so as to form said seam therebetween.

References Cited
UNITED STATES PATENTS

| | | | |
|---|---|---|---|
| 2,960,053 | 11/1960 | Meyer | 219—126 |
| 3,193,660 | 7/1965 | Colinet | 219—126 |
| 3,204,082 | 8/1965 | Dudko et al. | 219—126 |
| 3,235,705 | 2/1966 | Agnew et al. | 219—126 |
| 3,382,344 | 5/1968 | Hasegawa et al. | 219—126 |

RICHARD M. WOOD, *Primary Examiner.*

W. D. BROOKS, *Assistant Examiner.*